United States Patent [19]

Gillespie

[11] 4,071,252
[45] Jan. 31, 1978

[54] FLUIDICALLY DRIVEN TURNTABLE

[76] Inventor: David M. Gillespie, 451 E. Fourteen Mile Road, Birmingham, Mich. 48009

[21] Appl. No.: 721,626

[22] Filed: Sept. 8, 1976

[51] Int. Cl.$^2$ .............................................. G11B 3/60
[52] U.S. Cl. .................................... 274/39 R; 64/26; 192/58 A; 274/39 A
[58] Field of Search ........................ 64/26; 192/58 A; 274/39 A, 39 R, 9 R, 1 R

[56] References Cited

U.S. PATENT DOCUMENTS

| | | | |
|---|---|---|---|
| 1,778,756 | 10/1930 | Elmer | 274/39 A |
| 2,221,705 | 11/1940 | Glynn | 192/58 A |
| 2,237,907 | 4/1941 | Landis | 192/58 A |
| 2,342,414 | 2/1944 | Magill | 192/58 A |
| 2,557,799 | 6/1951 | Salmivouri | 192/58 A |
| 3,635,027 | 1/1972 | Moldenhauer | 64/26 |
| 3,683,248 | 8/1972 | Kobayashi et al. | 274/39 A |

*Primary Examiner*—Richard E. Aegerter
*Assistant Examiner*—John W. Shepperd
*Attorney, Agent, or Firm*—Cullen, Settle, Sloman & Cantor

[57] ABSTRACT

A method and apparatus for rotatably driving phonograph records, memory disks or the like while substantially reducing if not eliminating the undesirably effects of mechanical vibration and drive speed fluctuations. A support frame houses a tank which holds a quantity of liquid such as a mixture of silicon oil and water. A first generally circular member having a plurality of spaced vanes thereon is mounted within the tank adjacent the bottom thereof so that it can be positively rotatably driven from a drive mechanism external to the tank. A second generally circular member having a plurality of spaced vanes thereon is positioned vertically above the first member so that it is free to rotate with respect thereto. At least a portion of the vanes of the second member extend downwardly into the liquid but remain vertically spaced apart from the vanes of the first member. The liquid acts as a fluid coupling such that when the first member is positively driven, it causes the liquid to rotatively circulate within the tank. The rotatively circulating liquid operatively engages the immersed portion of the vanes of the second member thereby causing it to rotate as well. Phonograph records, memory disk or the like may be supportively carried by the upper surface of the second member. The nature of the fluid coupling and the flywheel effect achieved by its rotational circulation substantially reduces if not eliminates the undesirable effects normally attributable to mechanical vibration and drive speed fluctuations.

18 Claims, 4 Drawing Figures

FLUIDICALLY DRIVEN TURNTABLE

BACKGROUND OF THE INVENTION

1. Field of the Invention

This invention relates generally to phonograph equipment and more particularly to a fluidically driven turntable for rotatably supporting phonograph records, memory disks or the like.

2. Description of the Prior Art

Conventional turntables are normally supported on a base via a spring-mounting arrangement. The use of such a spring-mounting arrangements serves to protect the turntable from shocks and vibrations external to the instrument, but makes no correction for internal mechanical vibrations and rumble and provides no means compensating for variations in drive speed.

U.S. Pat. Nos. 3,103,364 and 3,674,278 teach phonograph turntables wherein the turntable is supported on a film of air to help isolate the turntable from vibration and mechanical noise. The use of an air bearing provides only a very limited type of vibration isolation and provides no means for compensating for variations in drive speed.

U.S. Pat. Nos. 1,747,866; 1,817,758, and 2,113,390 teach prior art phonograph apparatus wherein the turntable employs some type of flywheel arrangement to compensate for fluctuations in drive speed. Friction is reduced and/or damping action is achieved by the use of a viscous medium such as oil which may also serve a lubricating function.

None of these patents teach a true fluid coupling whereby the turntable is isolated from the drive means so as to eliminate or at least substantially reduce the undesireable effects resulting from mechanical vibrations produced in the bearings and the like. Furthermore, none of these patents teach accomplishing the flywheel effect to compensate for drive speed fluctuations by driveably rotating or circulating a quantity of liquid within a tank such that the liquid, itself drives the actual turntable and forms a flywheel therewith.

Many of the approaches taught by the prior art involve a deterioration of performance as the parts wear. Most of the prior art systems cannot insure that the turntable is driven with an absolutely constant speed due to motor wear, deterioration of the motor bearings, variations in line voltage, and the like. The mechanical coupling means and springs used to isolate the turntable from vibration and shock meet with only limited success and none is truely capable of isolating the turntable from internal vibration, oscillation and rumble generated within the unit itself.

The present invention provides a fluidically driven turntable which overcomes the disadvantages of the prior art and permits a vastly more accurate and faithful reproduction of the sounds or information recorded.

SUMMARY OF THE INVENTION

The turn table assembly of the present invention employs first and second generally circular members each having a central hub portion and a plurality of circumferentially spaced, generally radially disposed vane elements extending radially outward from the central hub portion. A tank is provided and a drive means external to the tank. A means is provided for rotatably mounting the first member within the tank and adjacent the bottom thereof such that the first member may be positively rotatively driven by the external drive means. Bearing means are provided for rotatively positioning the second member vertically above the first member such that each is free to rotate with respect to the other with minimum contact therebetween. A liquid is disposed within the tank so as to totally cover the first member and at least a portion of the vane elements of the second member for driveably fluidically coupling the first and second members while isolating the second member from the effects of a mechanical vibration and from fluctuations in drive speed.

The present invention also provides a method of rotatively supporting phonograph records, memory disks or the like so as to minimize the effects of mechanical vibration and speed fluctuations. The method includes providing a generally cylindrical tank and then mounting a first circular member having a plurality of vanes thereon adjacent the bottom of the tank. The tank is filled with sufficient liquid to more than cover the vanes of the first member and a second circular member having a plurality of spaced vanes thereon is positioned vertically above the first member so that both the first and second members are free to rotate with respect to one another. The method then contemplates supporting a phonograph record, memory disk or the like upon the upper surface of the second member for rotation therewith and rotatively driving the first member so as to circulate the liquid in the tank. The force of the circulating liquid is used to rotate the second member and therefore the record or disk supported thereon while isolating the second member from the first member to effectively reduce the effects of mechanical vibration and internal oscillation.

In the preferred embodiment of the present invention the liquid provides a true fluid coupling between the first member and the second member. Mechanical contact between the first and second members is minimized since the second member is at least partially floated upon the first member once the liquid is set in motion. The true fluid coupling between the first and second members through the medium of a liquid rather than a gas provides a true static fluid which will produce constant speed and torque once it is in continuous motion. The fluid coupling isolates the second member from "flutter" which is caused basically by imperfections in the mechanical drive systems conventionally used; from "wow" which is produced from imperfections in the drive systems and motors of most turntables, and from "rumble" or vibration which is caused by the sensitive cartridge of the turntable picking up any vibration or frequency of any moving part connected to the turntable platter. The liquid coupling employed in the present invention eliminates or at least minimizes all of these problems.

Furthermore, the present invention eliminates or at least substantially reduces the undesirable effects resulting from variations or fluctuations in drive speed. These fluctuations are eliminated or damped out due to the flywheel effect achieved by the rotatively circulating volumn of liquid together with the rotating members.

Additionally, if the liquid employed to achieve the fluid coupling and the flywheel effect includes a lubricating liquid such as silicon oil, the liquid can simultaneously serve to lubricate the bearings and to otherwise protect the internal parts of the system.

The fluidically driven turntable of the present invention provides a higher quality of sound reproduction than was heretofore achievable in the prior art. The system is relatively inexpensive, is extremely wearresistant, and is not difficult to transport since the liquid may be added after the system is installed at its desired location and subsequently removed if further transportation is required.

Other advantages and meritorious features of the present invention will be more fully understood from the following description of the drawings and preferred embodiments, the appended claims and the drawings which are briefly described hereinbelow.

DESCRIPTION OF THE PREFERRED EMBODIMENT

Figure 1:
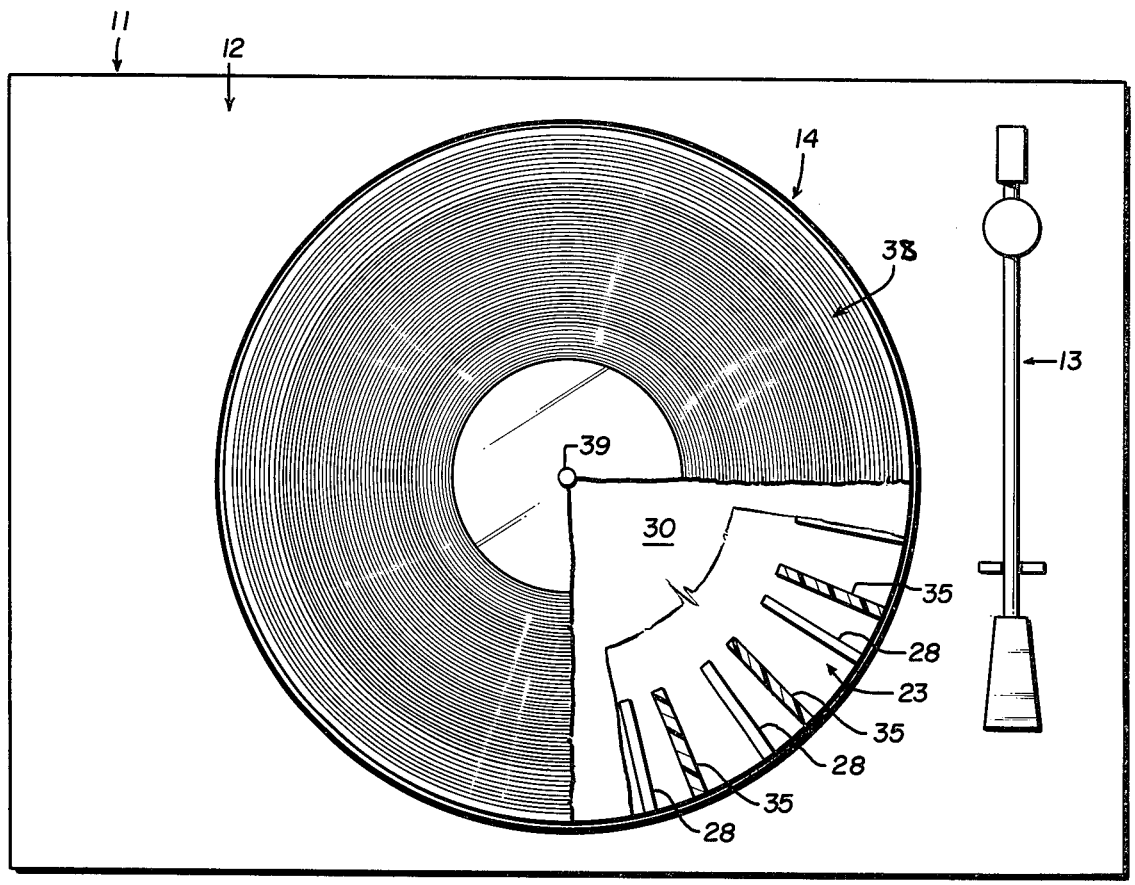
FIG. 1 is a top plan view, partially broken away, of a phonograph system emboding the turntable assembly of the present invention.

Referring now to the drawings and to FIGS. 1 and 2 in particular, the phonograph apparatus 11 used to described the preferred embodiment of the present invention will be discussed. The phonograph apparatus 11 includes a turntable support or frame 12 and a conventional tone arm assembly 13. The phonograph assembly 11 further includes a turntable assembly 14 and a drive means 15 therefore.

The turntable support or frame 12 includes a generally cylindrical central tank portion 16 having a tank bottom 17 and cylindrical tank-defining sidewalls 18. The frame 12 also includes a base portion 19 and a hollow base cavity 20 between the base portion 19 and the bottom 17 of the tank 16 for housing the drive assembly 15.

Disposed within the tank 16 is a first generally circular member 21 which is mounted centrally within the tank 16 and adjacent to but spaced vertically above the tank bottom 17. A second generally circular member 22 is disposed within the tank 16 vertically above the first circular member 21 so that each is free to rotate with respect to the other as hereinafter described.

The lower or first generally circular member 21 includes a generally flat circular disk 23 having a central hub portion 24. The outer peripheral portion 25 of the disk 23 terminates in a generally cylindrical lip portion 26 which extends vertically upward therefrom. A plurality of generally radially disposed vanes 27 extend from the central hub portion 24 radially outward along various radii of the disk 23 to abut the lip 26. Each of the plurality of vanes 27 includes a generally flat rectangular blade 28 having its lower longitudinal edge portion secured to the upper surface 29 of the disk 23 such that its upper longitudinal edge portion is spaced vertically above the surface 29 of the disk 23 and such that the plane defined by each of the blades 28 is substantially perpendicular to the plane of the surface 29 of the disk 23.

The second or upper circular member 22 includes a generally flat circular dish 30 having a central hub portion 31. The radially outer portion 32 of the disk 30 terminates in a generally cylindrical lip portion 33 which is vertically disposed downwardly from the lower surface 71 of the disk 30.

A plurality of generally radially disposed vanes 34 are circumferentially spaced about the surface 71 of the disk 30 and extend from the central hub portion 31 radially outwardly along various radii of the disk 30 to abut the lip portion 33. Each of the plurality of vanes 34 includes a generally flat rectangular blade 35 having its upper longitudinal edge secured to the surface 71 of the disk 30 so as to space its opposite longitudinal edge vertically below the surface 71 and facing but spaced apart from the upper longitudinal edge portion of the blades 28 of the first circular member 21.

The upper surface 36 of the disk 30 supportively carries a conventional turntable platter 37 such as a felt pad or the like. A conventional phonograph record 38 is supportively carried upon the turn table platter 37 for rotation therewith. The upper surface 36 of the disk 30 supportively mounts a vertically disposed spindle 39 which is secured to the surface 36 at the center of the central hub portion 31 of the disk 30 for engaging the central alignment apertures of conventional phonograph records 38.

Figure 2:
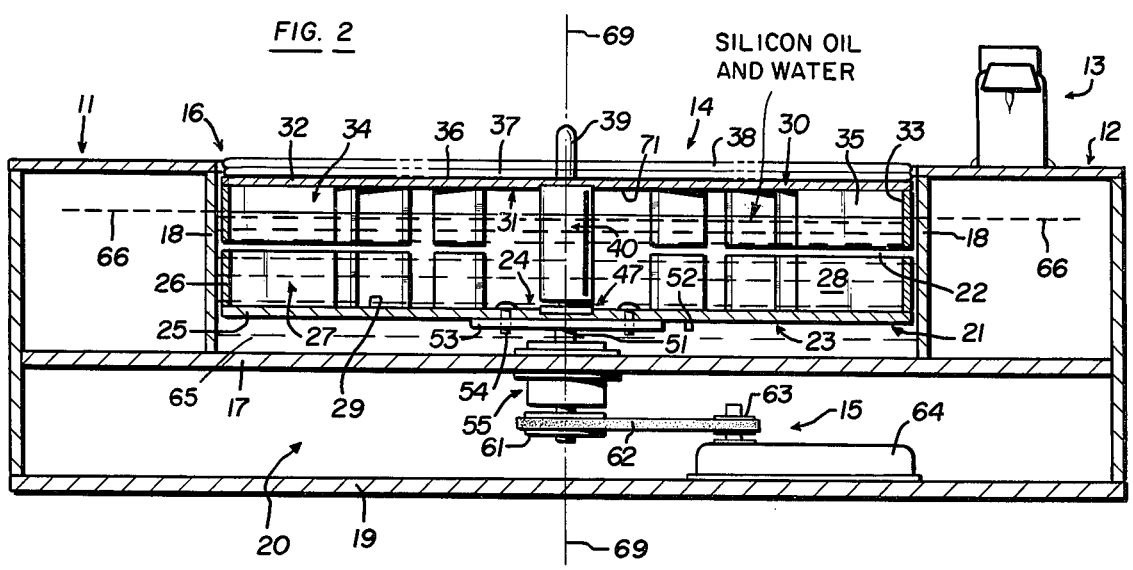
FIG. 2 is a front sectional view of the phonograph apparatus of FIG. 1.
Figures 3, 4:
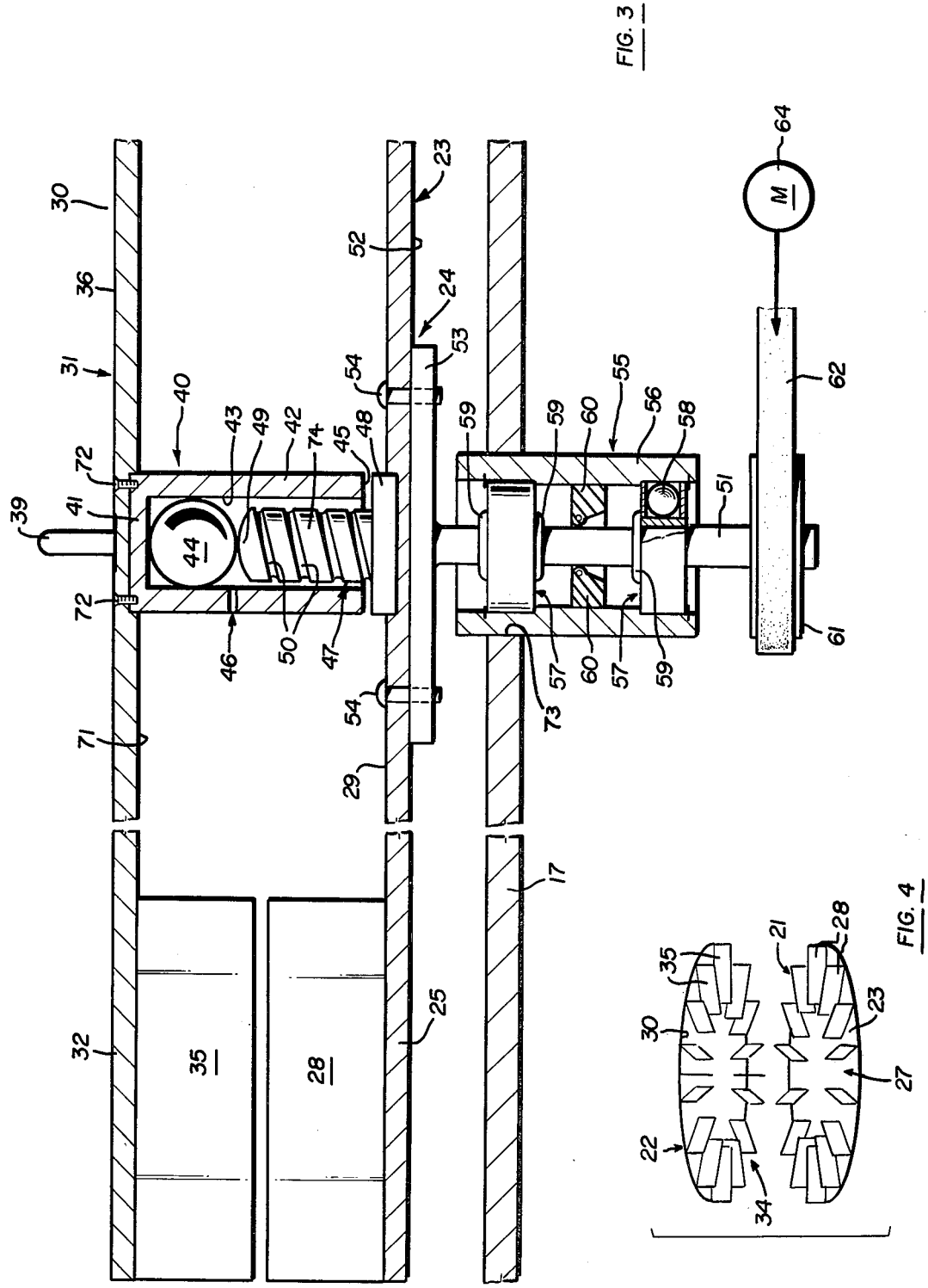
FIG. 3 is a blown-up secional view, partially broken away, of a portion of the turntable assembly of FIG. 2 illustrating the bearing means and drive means thereof.
FIG. 4 is a partially exploded perspective view of another embodiment of the first and second generally circular members of FIG. 2.

As described with respect to FIGS. 2 and 3, the opposite side 71 of the central hub portion 31 of the disk 30 mounts a female bearing member or collar 40. The collar 40 has a base 41 which is secured to the central hub portion 31 of the disk 30 by screws 72 or any suitable conventional fastening means. The cylindrical sidewalls 42 of the collar 40 define a tubular interior 43 adapted to receive a ball bearing element 44 therein. The ball bearing member 44 may include a notched portion, not shown but conventionally known, if desired. The lower distal end 45 of the walls 42 is spaced apart from the first circular member 21 and the sidewalls 42 may include one or more vent apertures 46.

The first circular member 21 includes a male bearing member or pin 47 mounted centrally on the surface 29 of the central hub portion 24 of the disk 23. The base portion 48 of the pin 47 is secured to the central hub portion 24 by any suitable conventional means. A portion of the elongated body 74 of the pin 47 and the tapered tip 49 thereof is adapted to be received into the interior 43 of the collar 40. The body 74 of the pin 47 may include spiraled lubrication passages or grooves 50 along the length thereof.

A drive shaft 51 is secured to the opposite surface 52 of the central hub portion 24 of disk 23 by means of a mounting plate 53 and screws or similar fastening means 54. The shaft 51 passes through a drive bearing assembly 55 mounted in an aperture 73 in the bottom 17 of the tank 16 so that the shaft 51 can be positively driven to rotate the first member 21 from a drive means 15 external to the tank 16.

The drive bearing assembly 55 includes cylindrical bearing walls 56 which pass through the aperture 73 in the bottom 17 and form a fluid tight seal therewith. Within the drive bearing assembly 55 are a pair of dual seal ball bearing assemblies 57 which include ball bearings 58. O-rings 59, such as neoprene seals or the like, may be used about the ball bearing assemblies 57 and a convention oil seal 60 may be used to insure that the tank 16 remains sealed against leakage. The lower end of the shaft 51 mounts a pulley 61 which can be driven by a belt 62 which is itself driven by a second pulley 63. The second pulley 63 is motor driven through suitable speed reduction gears, conventionally known, but not shown, by means of a multiple pole synchronous motor 64. However, while the motor 64 has been disclosed with reference to the preferred embodiment of the present invention, it will be understood by those skilled in the art that any suitable means for positively driving the first circular member 21 could be used.

FIG. 4 shows another embodiment of the first or lower circular member 21 and the second or upper circular member 22. It will, of course, be understood that the particular size, number, and angularity of the vanes 27, 34 of the first and second members 21, 22 may be varied as desired to meet the needs of a particular application. For example, the individual blades 28, 35 may be nonplanar and could be tilted, if desired, to achieve torque multiplications or the like. Similarly, the orientation of the blades of 28, 35 upon the disks 23, 30, could be varied vanes 27 of the driven member 21 can set the liquid 65 in motion and so long as the moving liquid 65 can exert its force upon the vanes 34 of the second member 22 to drive same.

The liquid 65 could be any suitable liquid. In the preferred embodiment, a mixture of 50% silicon oil and 50% water was utilized since this mixture appeared to greatly reduce vibration while providing for self lubrication. Water could be utilized by itself but the lubrication properties of the liquid 65 would be reduced. Similarly, the liquid 65 could be comprised entirely of oil but cost consideration could become a factor. In the present system, approximately two gallons of oil-water mixture weighing about 8 pounds per gallon was used to provide approximately a 16 pound flywheel for speed control purposes. In the preferred embodiment, the silicon oil utilized was purchases commercially as Dow-Corning 200 silicon oil.

The quantity of liquid 65 supplied to the tank 16 must be sufficient to cover or immerse the first member 21 and at least a portion of the tips of the vanes 34 of the second member 22. The liquid level in the preferred embodiment of FIG. 2 is indicated by the reference line 66. It will be noted that the second member 22 is positioned vertically over the first member 21 by the bearing means 40, 47. The male bearing member 47 is received within the aperture 43 of the collar 40 such that the only actual contact occurs between the tip 49 of the pin 47 and the ball 44 at the bottom of the housing 40. Since the liquid 65 is free to circulate within the cavity 43, and since the pin 47 is provided with grooves 50, self lubrication occurs and very little friction is present between the first and second members 21, 22. Once the members 21 and 22 are in motion, the second member 22 is at least partially supported by the liquid 65 so that even less friction occurs between the bearing members 40, 47.

In operation, the motor 64 is used to positively rotate or drive the shaft 51. The shaft 51 passes through the bottom 17 of the tank 16 by means of the drive bearing assembly 55 so that the shaft 51 may be rotated without the loss of liquid 65 from the tank 16. The positive rotation of the shaft 51 causes the positive rotation of the first circular member 21 via the shaft coupling plate 54 which secures the shaft 51 to the interior hub portion 24 of the disk 23 of the first member 21. The positive rotation of the first circular member 21 causes the liquid 65 to rotatively circulate within the tank 16 since the vanes 27 impart a force to the liquid 65 tending to circulate or rotate it within the tank 16.

The liquid 65 acts as a fluid coupling between the first circular member 21 and the second circular member 22 and transmits the force of the circulating liquid 65 to the vanes 34 of the second circular member 22 causing it to rotate as well. When a liquid is in motion so that no layer moves relative to an adjacent layer there will be no shear forces set up regardless of the viscosity of the liquid. The absence of the shear forces will insure a vibration free coupling. The boyant force exerted on a body by a static liquid in which it is submerged or floating acts vertically upward. There can be no horizontal component of the resultant force because the vertical projection of the submerged body or submerged portion of the second member 22 is always zero. This provides ideal vertical stability.

The fluid coupling provided by the liquid 65 isolates the second member 22 from the drive member 21 and eliminates or at least substantially reduces the effects of mechanical vibration produced within the support bearings 40, 47 and the drive bearings 55. Another major source of error is eliminated by the use of the liquid 65 since the circulating liquid 65 forms a significant flywheel when taken with the members 21, 22. Any minor fluctuations in drive speed due to variations in line current, motor malfunctions and the like are eliminated or at least substantially damped out by the flywheel effect so that flutter is eliminated or at least substantially reduced. Therefore, the turntable apparatus of the present invention eliminates or substantially reduces many of the problems inherent in the turntable apparatus of the prior art and represents a significant advance thereover.

In the preferred embodiment of the present invention, the first and second circular members 21 and 22 are substantially identical, integrally formed constructions such as may be produced by molding acrylic sheet material such as plexiglass. The frame 12 may be made from any suitable material, plastic or metal but, in the preferred embodiment, some type of lightweight material such as stainless steel may be used.

The present invention also contemplates a method of rotatively supporting phonograph records, memory disks or the like so as to minimize the effects of mechanical vibrations and speed fluctuations. The method contemplates providing a generally cylindrical tank 16 and mounting a first circular member 21 having a plurality of spaced vanes 27 adjacent the bottom 17 of the tank 16 such that the vanes 27 are disposed upwardly therefrom. The tank 16 is filled with sufficient liquid 65 to more than cover the vanes 27 of the first member 21 and a second circular member 22 having a plurality of spaced vanes 34 thereon is located vertically above the first member 21 so that the vanes 34 of the second member 22 are disposed downwardly toward the vanes 27 of the first member 21 but are spaced vertically therefrom. The downwardly disposed vanes 34 extend at least partially into the quantity of liquid 65 and the first and second members 21, 22 are positioned so that each is free to rotate with respect to the other.

The phonograph record, memory disk or the like is supported upon the upper surface 36 of the second member 22 for rotation therewith. The first member 21 is rotatably driven so as to rotatively circulate the liquid 65 in the tank 16 and the force of the circulating liquid 65 is utilized to rotate the second member 22 while isolating the second member 22 from the first member 21 to effectively reduce the effects of mechanical vibration and speed fluctuations.

The bearing members 40, 47 vertically position the second member 22 above the first member 21 so that each is free to rotate with respect to the other. The plane defined by the disk 30 of the second member 22 is parallel to the plane defined by the disk 23 of the first member 21 and both are substantially horizontal. The axis of rotation of the first member 21 is coincident with the axis of rotation of the second member 22 and is represented by axes 69 which is perpendicular to the plane of the disks 23 and 30.

With this detailed description of the specific apparatus used to illustrate the method and apparatus of the present invention and the operation thereof, it will be obvious to those skilled in the art that various modifications can be made without departing from the spirit and scope of the invention which is limited only by the appended claims.

I claim:

1. A turntable assembly for rotatively supporting phonograph records, memory disks and the like comprising:
   a relatively stationary tank means;
   a quantity of liquid contained within said tank means:
   a first symmetrical member having an axis of rotation and a plurality of generally radially disposed vanes;
   a second symmetrical member having an axis of rotation and a plurality of generally radially disposed vanes;
   means for supportively positioning said second member vertically above said first member such that said axes of rotation are coincident, the plane of said second member being parallel to the plane of said first member and both of said planes being generally horizontal, and such that either of said members is free to rotate with respect to the other about said coincident axes;
   said first member and at least a portion of said second member being disposed within said tank means such that all of the vanes of said first member and at least a portion of all of the vanes of said second member are immersed in said quantity of liquid contained within said tank means such that said liquid at least partially supports said second member vertically above said first member;
   a turntable platter means formed by the upper surface of said second member for rotation therewith, said platter means being adapted for supportively carrying said phonograph records, memory disks and the like; and
   means for rotatably driving said first member such that the rotation thereof causes said quantity of liquid to rotatively circulate within said stationary tank means for driveably rotating said second member while effectively isolating said turntable platter means from the effects of mechanical vibration and speed fluctuations.

2. The turntable assembly of claim 1 wherein said quantity of liquid contained within said tank means includes a mixture of silicon oil and water which serves as a fluid coupling between said first and second members to substantially reduce vibration from said positioning means and said drive means, said quantity of rotating liquid cooperating with said members to create a flywheel for substantially reducing the effects of drive speed fluctuations.

3. The turntable assembly of claim 1 wherein said first and second members are substantially identical.

4. The turntable assembly of claim 3 wherein each of said members includes a generally circular disk having a central hub portion and wherein said plurality of vanes includes a plurality of circumferentially spaced, vertically disposed elements extending from said central hub portion toward the periphery of said disk.

5. The turntable assembly of claim 4 wherein each of said disks includes a vertically disposed annular rim about the periphery thereof and wherein each of said elements is a substantially flat rectangular blade having a longitudinal edge portion secured to the surface of said disk such that said blade is radially oriented along its longitudinal axis and has its opposite longitudinal edge vertically spaced from said disk.

6. The turntable assembly of claim 1 wherein said means for supportively positioning said second member vertically above said first member includes a first tubular collar carried by one of said first and second members, a male bearing member carried by the other of said first and second members and adapted to be received within said collar with sufficient clearance thereabout to minimize rotational contact therebetween, and low-friction means for rotatively housing said male elements within said collar with substantially a single point of supportive contact therebetween such that both of said first and second members are free to rotate with respect to one another with a minimal amount of frictional contact therebetween.

7. The turntable assembly of claim 1 wherein the vanes of each of said members includes a plurality of circumferentially spaced, radially oriented blades.

8. The turntable assembly of claim 7 wherein each of said first and second members includes a generally flat disk having a central hub portion and wherein said plurality of blades is disposed about said disk such that one longitudinal edge portion of each of said elements is secured thereto while the other longitudinal edge portion is vertically spaced therefrom.

9. The turntable assembly of claim 8 wherein said first and second members are disposed such that the spaced longitudinal edge portions of the elements of said first member are spaced from and disposed toward the spaced longitudinal edge portions of said second member.

10. The turntable assembly of claim 9 wherein each of said generally flat disks is substantially circular.

11. The turntable assembly of claim 10 wherein each of said circular disks includes a vertically extending rim portion about the periphery thereof.

12. The turntable assembly of claim 10 wherein each of said blades includes a substantially flat rectangular element and each of said elements is longitudinally arranged along a different radius of said disk such that the plane of each of said elements is perpendicular to the plane of said disk.

13. The turntable assembly of claim 8 wherein said means for supportively positioning said second member vertically above said first member includes a bearing collar secured to the central hub portion of the generally flat disk of said second member and a male bearing element secured to the central hub portion of the generally flat disk of said first member such that said male bearing member is adapted to be rotatably received within said collar so as to position said second member vertically above said first member at a single point of mechanical contact therebetween while enabling said members to be free to rotate with respect to one another without undue contact friction therebetween.

14. The turntable assembly of claim 13 wherein said bearing collar includes at least one venting aperture therein, wherein said male bearing element includes a spiraled lubrication groove thereon for facilitating lubrication of said bearing collar and male bearing element combination, and wherein said bearing collar includes a closed end and a ball element disposed within said collar adjacent said closed end and wherein said male bearing includes an elongated body portion adapted to be received within said bearing collar and a tapered tip for contacting said ball element so as to provide the only mechanical support for positioning said second member vertically over said first member while allowing each to rotate freely with respect to the other with a minimum of vibration-transmitting contact.

15. A fluidically driven turntable assembly comprising:
  first and second generally circular members each having a central hub portion and a plurality of circumferentially spaced, generally radially disposed vane elements extending radially outwardly from said central hub portion;
  a tank;
  a drive means external to said tank;
  means for rotatively mounting said first member horizontally within said tank and adjacent the bottom thereof such that said first member may be positively rotatively driven by said external drive means;
  bearing means for rotatively mounting said second member horizontally within said tank and vertically above said first member such that each is free to rotate with respect to the other, said bearing means supporting said second member vertically above said first member at a single central contact location for minimizing the transmission of mechanical vibration therebetween; and the upper surface of said second circular member defining a turntable platter means adapted to carry phonograph records, memory disks and the like;
  liquid means disposed within said tank and covering all of said first member and at least a portion of all of the vane elements of said second member for drivably coupling said first and second members during all rotational speeds while isolating said second member from the effects of mechanical vibration and fluctuations in drive speed.

16. The turntable assembly of claim 15 wherein each of said first and second members includes a substantially flat circular disk and each of said vane elements is a substantially flat rectangular blade having one longitudinal edge portion secured to a surface of said disk so as to orient said blade longitudinally along a radius of said disk.

17. The turntable assembly of claim 15 wherein said liquid means includes water and wherein the positive rotation of said first member whose vane elements are totally immersed within said liquid means causes said liquid means to rotate within said tank, the rotating liquid means operatively engaging that portion of the vane elements of said second member which are immersed therein so as to effect the rotation of said second member, the rotation of said first and second members and said liquid means forming a massive flywheel for damping out fluctuations in drive speed while simultaneously effectively isolating said second member from mechanical vibrations normally associated with said bearing means.

18. A fluidically driven turntable assembly comprising:
  a stationary tank;
  a generally symmetrical member disposed at least partially within said tank for rotation therein in a generally horizontal plane, the lower side of said member having a plurality of spaced vane elements and the upper side forming a turntable platter means for supportively positioning said member centrally in said tank for rotation in a horizontal plane;
  means for positively rotatably circulating said liquid means about said stationary tank such that said rotatably circulating liquid means at least partially floats and rotatably drives said member for effectively isolating said member from mechanical vibration while substantially reducing the effect of fluctuations in drive speed by said member and said rotating liquid means combining to achieve a flywheel effect.

* * * * *